UNITED STATES PATENT OFFICE.

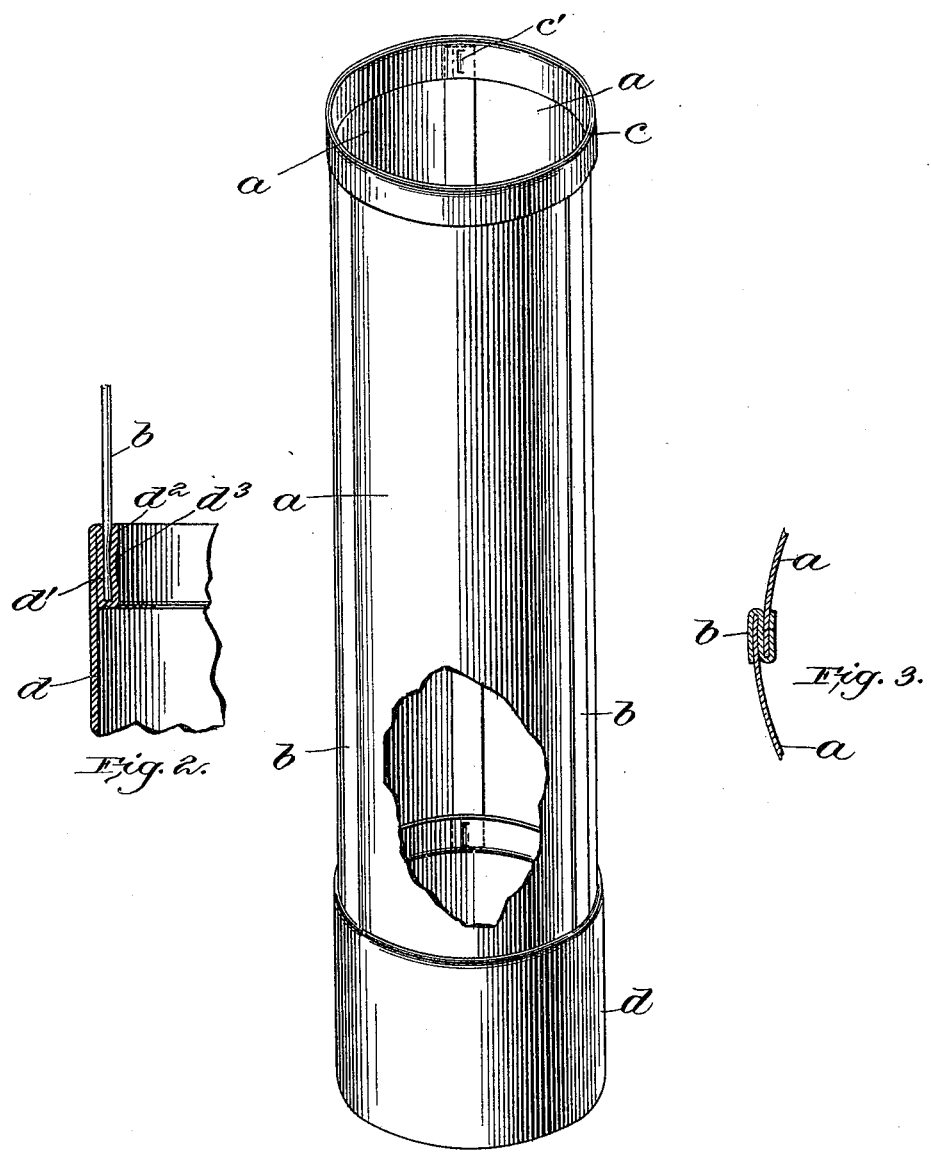

FREDERICK R. HUSE, OF WINCHESTER, MASSACHUSETTS, ASSIGNOR TO THE NORTH CAROLINA MICA COMPANY, OF BOSTON, MASSACHUSETTS.

LAMP-CHIMNEY.

SPECIFICATION forming part of Letters Patent No. 613,278, dated November 1, 1898.

Application filed November 23, 1897. Serial No. 659,611. (No model.)

*To all whom it may concern:*

Be it known that I, FREDERICK R. HUSE, of Winchester, county of Middlesex, and State of Massachusetts, have invented an Improvement in Lamp-Chimneys, of which the following description, in connection with the accompanying drawings, is a specification, like letters on the drawings representing like parts.

This invention has for its object to construct a chimney, especially designed for gas-burners, which will be strong and durable and will not be injuriously affected by heat, thereby especially adapting it for use on Welsbach burners, and one that will not be easily cracked or broken.

In accordance with this invention the chimney is composed, essentially, of a number of transparent panels or sections, preferably of mica, and uniting-strips at the side edges thereof, by which they are connected together to form a cylinder or tube, and at the upper end of the transparent tube thus formed a ferrule is provided, which is made inverted-U shape in cross-section, adapting it to fit upon the upper edge of the tube and to embrace the upper ends of the uniting-strips, and said ferrule is attached to said tube by pressure thereon opposite the uniting-strips. A wide ferrule is attached to the lower end of said transparent tube, it being made quite wide for the purpose of providing a long sleeve to especially adapt the chimney to be held by a set of spring-acting fingers, which may be adapted to receive it, and the transparent tube is attached to the upper edge of said wide ferrule to thereby save the amount of transparent material which would be required in the construction of the chimney were said ferrule made narrow and of the requisite length.

In attaching the tube to the upper edge of the wide ferrule an internal annular socket or recess is formed or provided at the upper edge of said ferrule, which is adapted to loosely receive the lower edge of the tube, and when said tube is placed in said socket the walls of said socket are compressed, particularly at points opposite the uniting-strips, to thereby attach the tube and ferrule together. It is preferable to indent the inside wall of the annular socket at points opposite the lower ends of the uniting-strips to thereby attach the ferrule to the uniting-strips. A skeleton frame will be thus provided, composed, essentially, of an upper and lower ferrule and strips connecting them together, which serve as uniting-strips for the transparent panels composing the transparent tube.

Figure 1 shows in front elevation a chimney embodying this invention, it being broken out to more fully show the manner of attaching the lower ferrule to the tube; Fig. 2, a sectional detail showing the means by which the tube and ferrule are attached together, and Fig. 3 a cross-sectional detail of one of the uniting-strips.

In the drawings I have shown three sections or panels *a a a*, preferably of mica, and said panels are herein shown as formed into a cylinder or tube by uniting the side edges together. Uniting-strips *b*, herein shown as S shape in cross-section, are employed for uniting the side edges together; but I do not desire to limit my invention to the employment of any particular form or construction of uniting-strips. The uniting-strips terminate flush with the upper and lower edges of the tube. To the upper end of said transparent tube a ferrule *c* is provided, which is inverted-U shape in cross-section and is made as a continuous ring, and it is placed loosely upon the upper edge of the tube embracing the upper ends of the uniting-strips, and the ferrule having been placed upon the upper edge of the tube its side walls are compressed together, and particularly at points opposite the uniting-strips, to thereby firmly attach the ferrule to the upper ends of the uniting-strips. I preferably indent the inside wall of the ferrule opposite the uniting-strips, as at *c'*, but it may be otherwise compressed. At the lower end of the tube a wide ferrule *d* is provided, which is likewise made as a continuous ring or tube, and the tube is attached to the upper edge of said wide ferrule, and, as herein shown, said ferrule has at its upper edge an internal annular socket or recess formed by inturning the upper edge of the ferrule, as at $d'$, and thereafter upturning said inturned edge, as at $d^2$, and the lower end of the tube is placed loosely into the annular socket or recess thus provided at the upper edge of the wide ferrule, and then the walls of said annular socket or recess are severely compressed together, particularly at points opposite the uniting-strips $b$, to thereby firmly attach the two parts together. In thus attaching the two parts together by pressure the inside wall of the annular socket or recess may be indented at points opposite the uniting-strips, as at $d^3$, thereby firmly attaching the ferrule to the strips and permitting the transparent panels to fit loosely in the socket between such indented points.

Many ways may be devised for compressing the walls of the annular socket or recess to thereby attach the two parts together besides indenting the inside wall opposite the lower ends of the uniting-strips, as herein shown, which will come within the spirit and scope of this invention. The parts when thus assembled present a skeleton frame composed of an upper and a lower ferrule and a number of uniting-strips and transparent panels supported by it.

I claim—

The chimney composed of a number of transparent panels, uniting-strips at the side edges thereof for uniting them together to form a tube, a wide ferrule at the lower end of said tube having its upper edge bent to form an internal annular socket or recess which receives the lower end of said tube, the walls of said annular socket or recess being compressed opposite the uniting-strips to firmly attach the tube and ferrule together, substantially as described.

In testimony whereof I have signed my name to this specification in the presence of two subscribing witnesses.

FREDERICK R. HUSE.

Witnesses:
B. J. NOYES,
M. E. FOSTER.